United States Patent [19]

Tano

[11] 4,408,487
[45] Oct. 11, 1983

[54] CARTON'S DEPRESSED LINE HEIGHT MEASURING DEVICE

[75] Inventor: Mikio Tano, Tokyo, Japan

[73] Assignee: Dai Nippon Insatsu Kabushiki Kaisha, Tokyo, Japan

[21] Appl. No.: 270,514

[22] PCT Filed: Nov. 19, 1980

[86] PCT No.: PCT/JP80/00283
§ 371 Date: Jul. 21, 1981
§ 102(e) Date: May 29, 1981

[87] PCT Pub. No.: WO81/01460
PCT Pub. Date: May 28, 1981

[30] Foreign Application Priority Data

Nov. 21, 1979 [JP] Japan .................. 54-160399

[51] Int. Cl.³ .................. G01B 7/34; G01B 11/30
[52] U.S. Cl. .................. 13/159; 33/147 L; 250/571
[58] Field of Search .................. 73/159; 33/147 L; 250/571

[56] References Cited

U.S. PATENT DOCUMENTS

| | | | |
|---|---|---|---|
| 2,503,720 | 4/1950 | Gieseke | 33/147 L X |
| 2,794,258 | 6/1957 | Danielsson | 33/147 L |
| 3,264,740 | 8/1966 | Veale | 73/159 X |
| 3,470,739 | 10/1969 | Takafuji et al. | 73/159 |
| 3,553,668 | 1/1971 | Urmenyl | 33/147 L X |
| 4,271,699 | 6/1981 | Williamson | 33/147 L X |

Primary Examiner—E. R. Kazenske
Assistant Examiner—Joseph W. Roskos
Attorney, Agent, or Firm—Koda and Androlia

[57] ABSTRACT

A device for measuring the height of a depressed line (or a protruded stripe along a folding line) which, when a carton is formed by holding a sheet or the like and bonding the ends together, is formed in the carton. In the device, the height of the protruded stripe is mechanically or optically detected under the condition that the depressed line has been formed, so that it is converted into an electrical signal which is displayed and/or printed out.

The mechanical detector is made up of a roller which is supported in such a manner that its axis is variable in position and generates an electrical signal according to the roller axial position variation. The optical detector applies a light beam to a sheet or the like and receives a light beam reflected from the sheet or the like.

15 Claims, 13 Drawing Figures

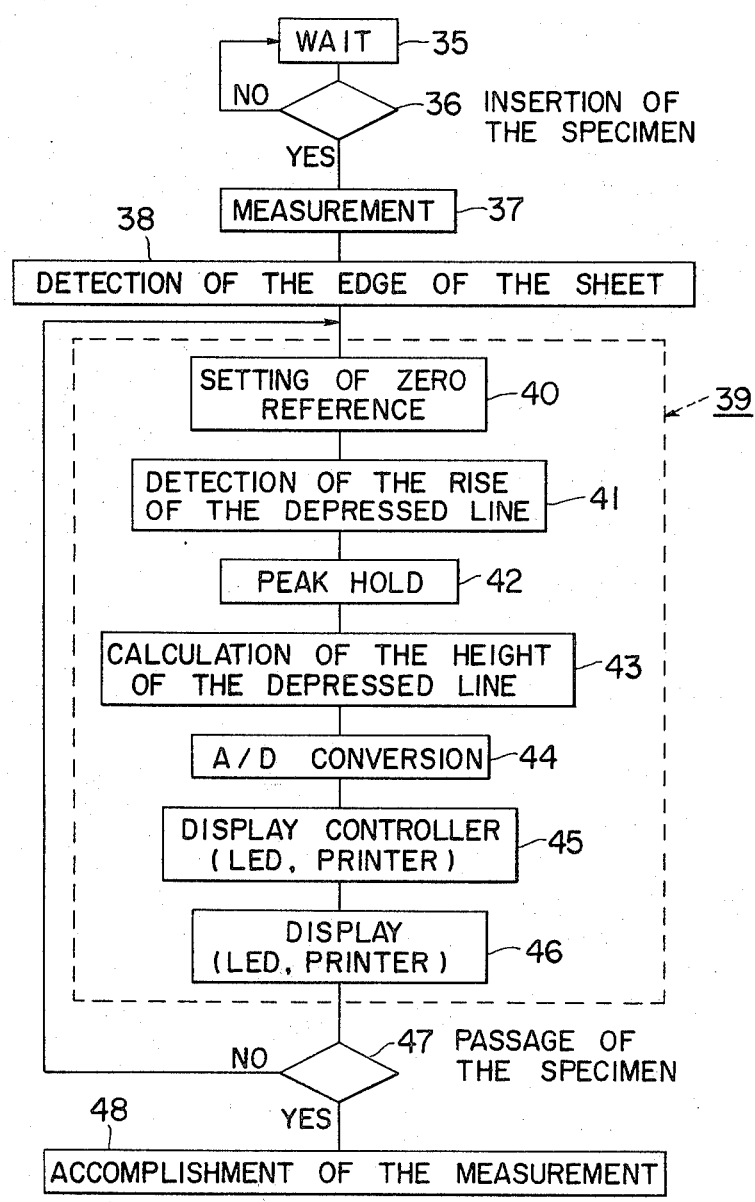

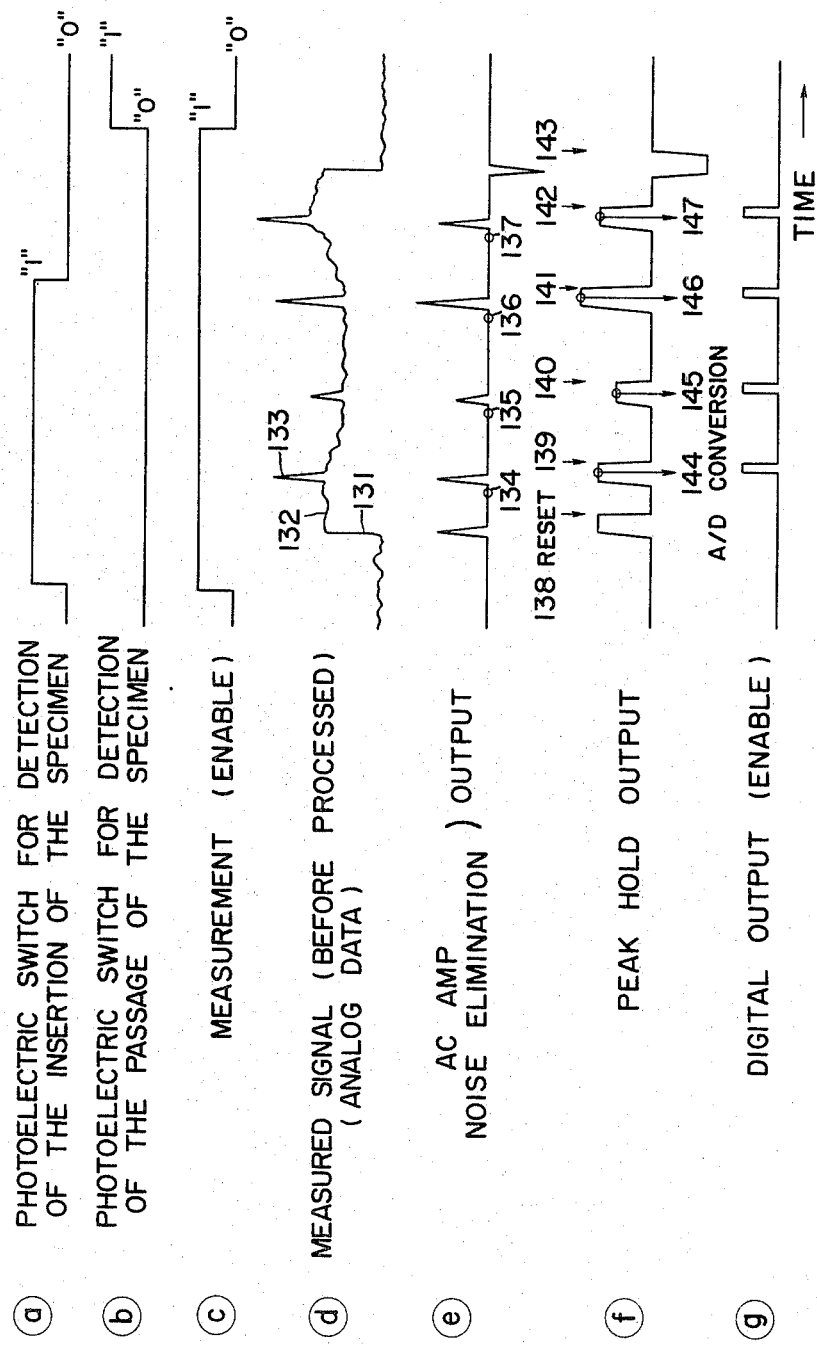

CARTON'S DEPRESSED LINE HEIGHT MEASURING DEVICE

TECHNICAL FIELD

This invention relates to a device for measuring the height of a line depressed in a carton.

BACKGROUND ART

If the bending torque of a carton's folding line (depressed line) is abnormal, then when the carton is loaded on a box manufacturing machine, a boxing machine or the like it may be unsatisfactorily opened or folded, or may be cracked. Accordingly, in order to eliminate such difficulties, it is necessary to measure the bending torque in advance, thereby to determine whether or not the bending characteristic is acceptable. However, the measurement of the bending torque takes a considerably long period of time. Therefore, a simple method has been employed in which the height of a depressed line which is in correlation with the bending torque is measured with a dial gauge or the like. More specifically, a specimen is inserted between the surface table and the measuring element, a zero reference is determined from a flat part of the specimen where no depressed line is formed, and thereafter the height of a depressed line is measured. And, in order to measure the height of the next depressed line, it is necessary to determine the zero reference again.

As is apparent from the above description, the method is disadvantageous in that as it is necessary to determine the zero reference for every depressed line, it still takes much time.

In view of the foregoing, this utility model is intended to provide a device which can automatically convey a specimen and automatically carry out the determination of a zero reference for every depressed line, the measurement of a depressed line height and the displaying and recording of the value of the height thus measured.

DISCLOSURE OF INVENTION

The foregoing object of the invention is achieved by the provision of a carton's depressed line height measuring device which has a function of automatically measuring the height of a depressed line from a sheet surface near the depressed line even if the sheet thickness of a specimen is varied, and a function of displaying the height of each depressed line.

BRIEF DESCRIPTION OF THE DRAWINGS

FIG. 11 is a flow chart of the measurement.

FIG. 13 is a time chart for a description of the measurement.

BEST MODE FOR CARRYING OUT THE INVENTION

One embodiment of this utility model will be described with reference to the drawings.

Figure 1:
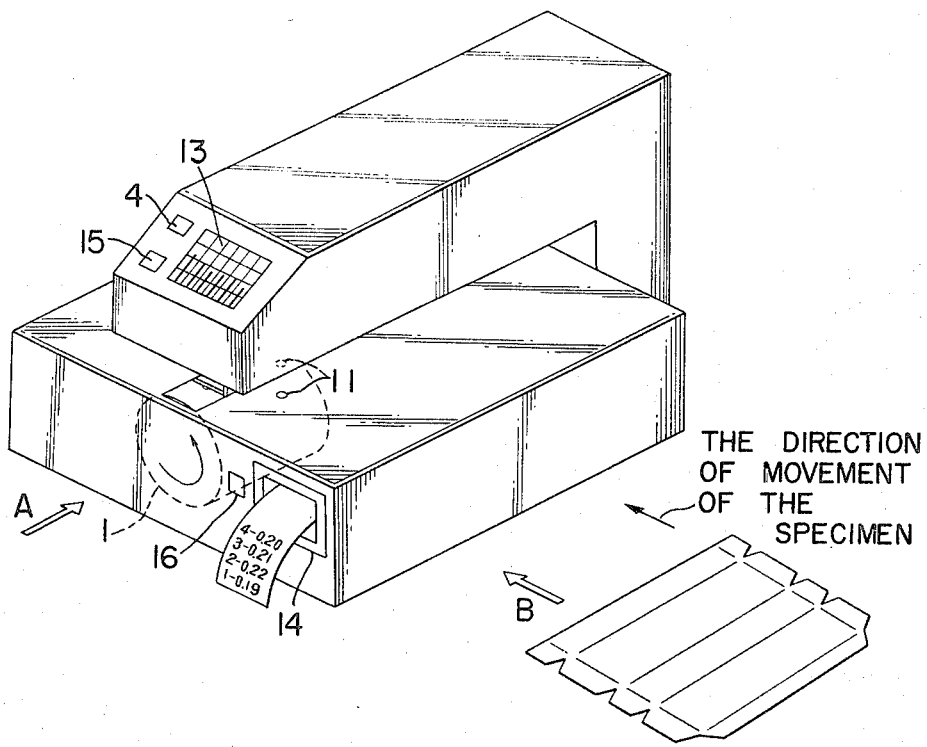
FIG. 1 is a perspective view of one embodiment of this invention.

As shown in FIG. 1, a roller 1 is provided to convey a specimen. The conveying roller 1 is coupled through a belt 3 to a drive motor 2. The roller 1 is rotated at a constant speed when a power button 4 is turned on.

Figure 3:
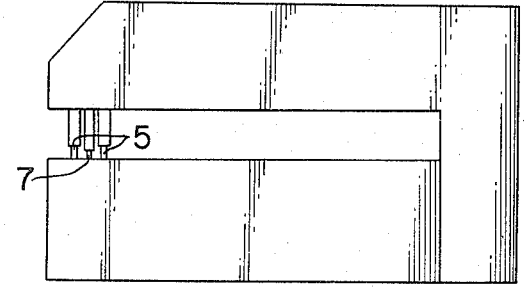
FIG. 3 is a side view in the direction of the arrow B in FIG. 1.
Figure 5:
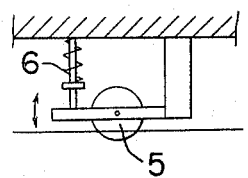
FIG. 5 is an explanatory diagram showing a part of the sheet retaining section.

Two sheet retaining rollers 5 are provided so that the measurement can be carried out even if the specimen is somewhat bent (FIG. 3). The rollers 5 are abutted against the conveying roller 1 by means of springs 6, respectively (FIG. 5). The part of the conveying roller 1, abutted against the sheet retaining rollers 5, is knurled to prevent the slip of the specimen. Instead of the method of knurling the part, a method may be employed in which the part of the conveying roller 1 is covered with a rubber lining.

Figure 4:
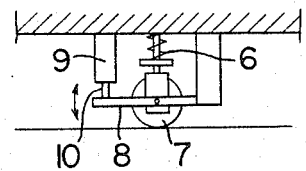
FIG. 4 is an explanatory diagram showing a part of the measuring section.

A measuring section shown in FIG. 4 scans the specimen with a roller 7, and transmits the movement of the roller through a lever 8 to the core 10 of a differential transformer 9.

In this embodiment, the differential transformer which is of the contact type is employed as a displacement detecting means. However, instead of this, a method of using a moving coil, a potentiometer, a strain gauge or a semiconductor pressure resistance may be employed. Alternatively, a contactless optical method using no scanning roller may be employed.

Furthermore, a digital dial gauge system may be employed in which a linear displacement is converted into a rotational displacement with a rack and a pinion and the displacement is outputted as a pulse signal with a rotary encoder.

A photoelectric switch 11 is provided in a specimen inlet, in order to detect the insertion of a specimen and to reset the display of the previous measurement value. On the other hand, another photoelectric switch 12 is provided in a specimen outlet, in order to detect the completion of measurement of a specimen.

Otherwise, by providing a reset switch, the insertion of a specimen can be inputted to the device when the reset switch is manually operated.

Figure 2:
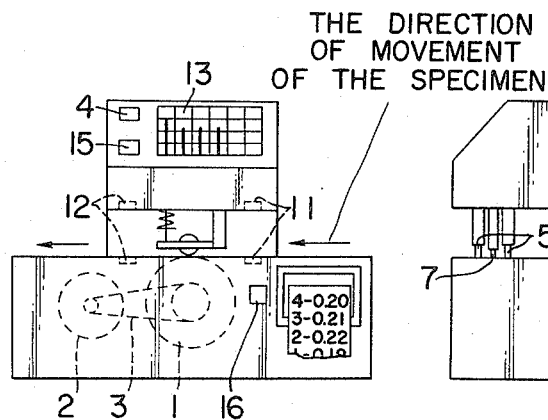
FIG. 2 is a front view, as viewed in the direction of the arrow A in FIG. 1.

Measurement values can be outputted by the utilization of a method of displaying a measurement value on a bar graph 13 (for instance by using LED's, FIG. 2) and a method of recording it with a printer 14.

Figure 6:
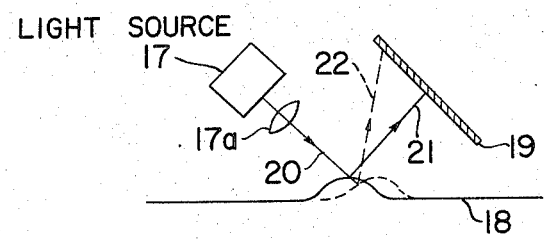
FIG. 6 is an explanatory diagram for a description of an optical measuring method.

An optical measuring method shown in FIG. 6 will be described.

When an incident light beam 20 from a light source 17 is applied through a lens 17a, as a light spot, to the surface 18 of a specimen, its reflection light beam is moved, as indicated at 21 and 22, on a light receiving unit 19 according to the unevenness of the specimen surface. The light receiving unit 19 has a screen with a plurality of sensors arranged thereon. The height of the depressed line is obtained from the distance of movement of the reflection light beam as indicated at 21 and 22.

Figure 7:
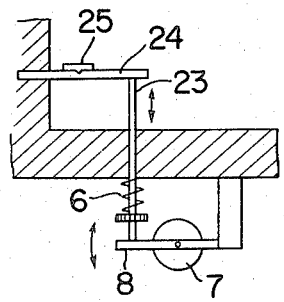
FIG. 7 is an explanatory diagram illustrating a measuring method using a semiconductor pressure resistance sensor.

A measuring method using a semiconductor pressure resistance displacement sensor shown in FIG. 7 will be described.

The movement of the lever 8 is transmitted through a rod 23 to a plate 24. A semiconductor gauge 25 is fixedly secured to the plate 24. Therefore, as the plate 24 is bent, the semiconductor gauge 25 is subjected to compression or tension, as a result of which the resistance is changed. The height of the depressed line is measured from the change of the resistance.

In the other methods, for instance in the method of measuring a depressed line height by using a potentiometer or a digital dial gauge, the measurement can be achieved merely by replacing the differential transformer in FIG. 4, by a linear type potentiometer or a digital dial gauge.

Figure 8:
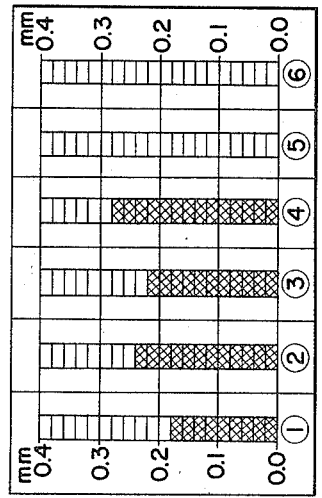
FIG. 8 is an external view of the display section.

A display section of the embodiment shown in FIG. 8 will be described.

The numbers ① through ⑥ in the lower portion of the display section indicate the order of depressed lines which are measured while a specimen passes through the device. Standard lines "0.1 mm", "0.2 mm", etc. are provided on the display section to facilitate the reading of display values. Alternatively, the measurement value indicating sections may be colored different from one another as the section of 0.0 mm to 0.1 mm is formed with a green LED, the section of 0.1 mm to 0.2 mm with an orange LED and the section of 0.2 mm to 0.3 mm with a red LED. A switch 15 is provided to reset the display after the power switch has been turned on or the display which is no longer necessary. A special switch 16 is provided for the printer, because it is used as the case may be.

Next, the flow of signal which is effected for the time interval which elapses from the instant that a measurement is started until the measurement value is displayed will be described.

Figure 9:
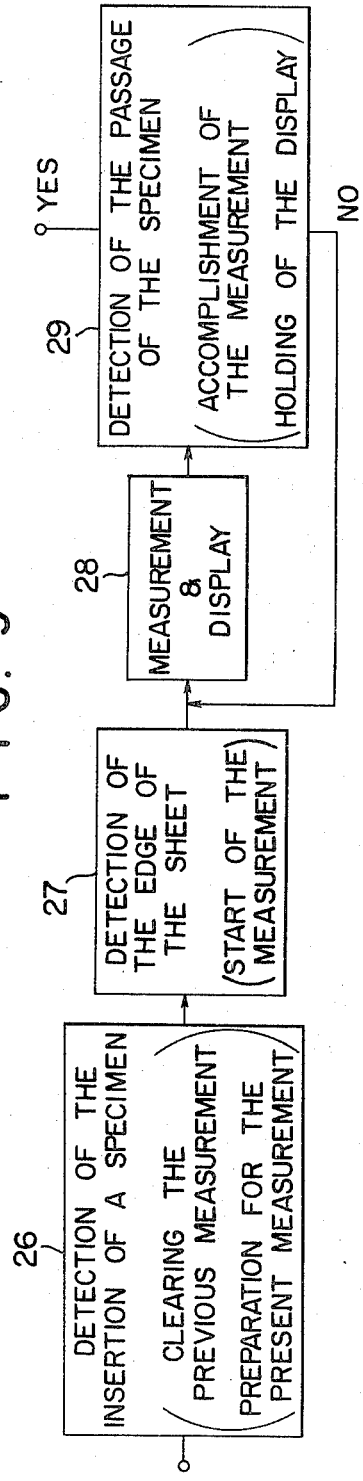
FIG. 9 is a block diagram showing operating steps in the signal processing section.

FIG. 9 shows operating steps effected in a signal processing section. In an operating step 26, the insertion of a specimen is detected (the previous measurement value being cleared, and a preparation for the present measurement being made). After the edge of the sheet is detected in an operating step 27 (the measurement being started), the measurement and display are carried out in an operating step 28. In an operating step 29, the passage of the specimen is detected (the measurement being accomplished, and the display being held). Thus, one measurement has been achieved.

Figure 10:
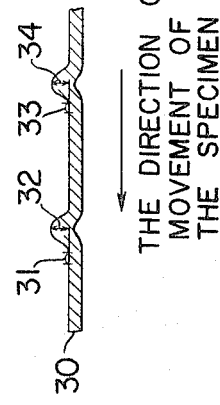
FIG. 10 is a sectional view of a specimen.

FIG. 10 shows a sectional view of a specimen. In FIG. 10, the arrow indicates the direction of movement of the specimen.

Figure 12:
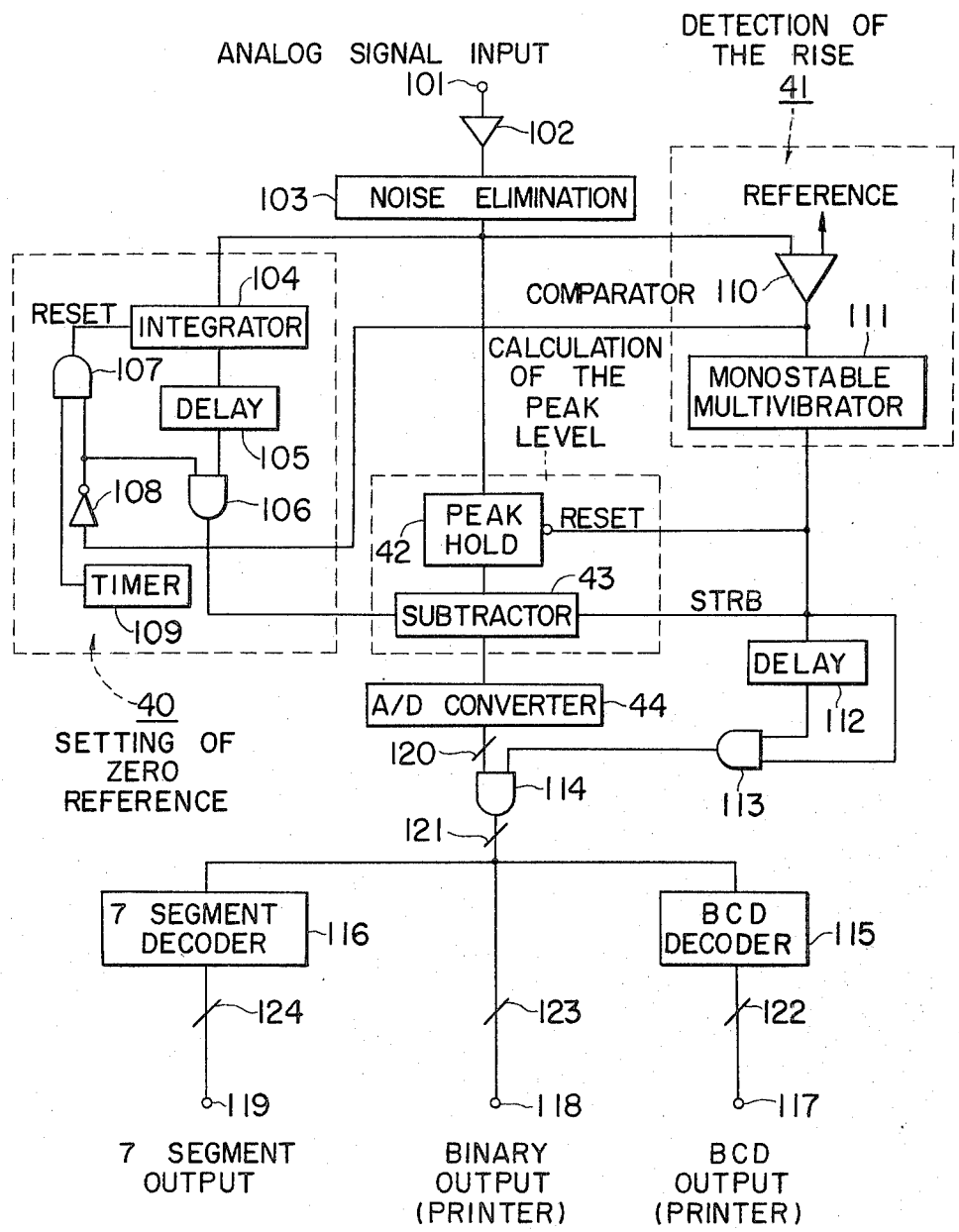
FIG. 12 is a block diagram showing a measurement and display part in FIG. 9 in more detail.

A flow chart in FIG. 11 indicating the steps of measurement and FIG. 12 showing in more detail a circuit for performing the measurement and display in the operating step 28 in FIG. 9 will be described.

When, as shown in FIG. 9, a specimen is inserted in the device and comes to the photoelectric switch 11, the specimen insertion detecting circuit 26 is operated by the photoelectric switch 11 so that the previous measurement value on the display section 13 is cleared and the device becomes ready for the present measurement.

When the specimen is inserted between the scanning roller 7 and the conveying roller 1, the circuit 27 for detecting the edge 30 of the sheet is operated to start the measurement, so that the measurement and display (28) of a depressed line height are carried out. When the specimen passes through the photoelectric switch 12 in the specimen outlet, the circuit 29 for detecting the passage of a specimen is operated. Thus, the measurement has been achieved; however, the display is maintained as it is.

The measurement and display (28) will be described in more detail.

After the sheet edge 30 has been detected, a circuit 40 for setting a zero reference for measuring a depressed line height is operated. The zero reference setting circuit 40 sets as the zero reference the average value of the heights of small regions 31 and 33 which are located immediately before depressed lines, respectively. Although not shown, the average value of heights immediately after the depressed lines may be employed as the zero reference. Next, the rises 32 and 34 of the depressed lines are detected by a detecting circuit 41, and the maximum value is detected and held by a peak hold circuit 42 while the depressed lines pass through the scanning roller 7.

This signal is applied through a subtractor 43 to an A/D converter, where it is converted into a digital data, and a data type conversion level adjustment is carried out by a display controller 45. As a result, the recording operation is carried out by the printer, or the bar graph display 46 is carried out by the LED or the like. The first depressed line measurement value is displayed at the part ① of the display section in FIG. 8, and is held until the next specimen is inserted.

The operation of step 39 as described above is repeatedly carried out until the passage of the specimen through the specimen outlet has been detected, and whenever the operation is carried out, the height of a depressed line is measured and displayed. In the case where the digital dial gauge or the like is used, it is unnecessary to provide the A/D converter.

In FIG. 12, reference numeral 101 designates an analog signal input terminal; 102, an AC amplifier; 103, a noise eliminating circuit; 104, an integrator; 105 and 112, delay circuits; 106, 107, 113 and 114, AND circuits; 108, an inverter; 109, a timer; 110, a comparator; 111, a monostable multivibrator; 115, a BCD decoder; 116, a 7-segment decoder; 117, a BCD output terminal connected to the printer; 118, a binary output terminal connected to the printer; 119, a 7-segment output terminal; and 120 through 124, bus lines. In the measurement, when the specimen's edge 30 is detected, the circuit 40 for setting a zero reference to measure the height of a depressed line is operated, the rise of the depressed line is detected by the detecting circuit 41, and while the depressed line passes through the scanning roller 7 the maximum value is detected by the peak hold circuit 42, as a result of which the maximum values are displayed on the display section 13 in the order of the depressed lines measured. FIG. 13 is a time chart for detection. More specifically, the part ⓐ of FIG. 13 shows a time chart of the specimen insertion detecting photoelectric switch, the part ⓑ a time chart of the specimen passage detecting photoelectric switch, the part ⓒ a time chart of a measurement (enabling), the part ⓓ a time chart of a measurement signal (analog data before processed), the part ⓔ a time chart of an AC amplifier noise elimination output, the part ⓕ a time chart of a peak hold output, and the part ⓖ a time chart of an digital output. Furthermore in FIG. 13, reference numeral 131 represents a sheet edge; 132, a sheet surface; 133, a depressed line; 134 through 137, zero settings; 138 through 143, resetting; and 144 through 147, A/D conversion.

Described above is one example of the signal processing method in the case where the signal processing circuit is formed with hardware. The same function can be performed with a signal processing circuit using a microcomputer.

In this case, the analog signal provided by the detector (such as the differential transformer) can be converted into a digital signal by the A/D converter so as to be loaded in a CPU (central processing unit) and memories. Therefore, not only the edge detection, peak detection and peak height detection can be carried out by using programs, but also the data conversion and the output control for display can be carried out. Accordingly, the device can be made compact in arrangement.

As the operating specification can be varied by changing the programs, a carton's depressed line height measuring device high in operational flexibility can be obtained.

As is apparent from the above description, according to the invention, the height of a carton's depressed line can be measured in a very short time, and the resultant measurement value can be displayed as a bar graph with real time. Accordingly, it can be determined at a glance whether or not the height of a depressed line is acceptable.

INDUSTRIAL APPLICABILITY

Cartons are industrially extensively in demand as containers for putting articles or commodities therein.

A mechanical torque measuring device has been used to control the quality of a carton's depressed line. However, as the measurement takes a relatively long times, recently a method is usually employed in which the height of a depressed line is visually determined under a light. The method of visually determining the height of a depressed line uses one's intuition, and accordingly, the results of determination are variable depending on the degrees of skill of measuring persons, with the result that troubles due to unsatisfactory quality control are caused.

In view of the foregoing, one feature of this invention resides in that a number of depressed lines can be automatically measured in a short time, which greatly increases the efficiency of quality control. Furthermore, as the height of a depressed line can be numerically positively controlled, the troubles due to unsatisfactory quality control can be eliminated. Thus, the invention has significant merits.

In addition, the invention is applicable to the measurement of the height of a depressed line formed in a bankbook (magnetic bankbook) or the like.

I claim:

1. A carton's depressed line height measuring device comprising:
    means for conveying in one direction a specimen which is formed into a carton by being folded and bonded together at predetermined ends;
    means provided in said conveying means, for contacting the surface of said specimen to provide action according to the unevenness of said surface;
    a means for forming an electrical signal according to the action of said action providing means;
    zero setting means for detecting the rise of a signal from said signal forming means, which is caused according to the thickness of said specimen, to form a zero reference signal;
    peak holding means for detecting and holding the peak value of said signal from said signal forming means; and
    outputting means for substracting an output of said zero setting means from an output of said peak holding means and outputting the result of substraction.

2. A device as claimed in claim 1, in which said conveying means comprises:
    a first roller which is driven by a drive source, to convey said specimen; and
    a pressurizing roller for bringing said specimen into close contact with said first roller.

3. A device as claimed in claim 1, in which said action providing means is a roller having an axis which is movable substantially perpendicularly of the direction of conveyance of said conveying means.

4. A device as claimed in claim 1, in which said signal forming means has an element for forming an analog electrical signal according to the action of said action providing means.

5. A device as claimed in claim 1, which has an element for forming a digital signal according to the action of said action providing means.

6. A device as claimed in claim 1, which comprises means for detecting insertion of said specimen, an output of said insertion detecting means being utilized to end the holding operation of said peak holding means.

7. A devices as claimed in claim 1, in which said outputting means is a display unit.

8. A device as claimed in claim 7, in which said outputting means is provided with a printer.

9. A carton's depressed line height measuring device comprising:
    means for conveying in one direction a specimen which is formed into a carton by being folded and bonded together at predetermined ends;
    a light source for applying a light beam to the surface of said specimen which is conveyed by said conveying means;
    means for detecting light reflected from the surface of said specimen, to form an electrical signal according to the unevenness of the surface of said specimen;
    zero setting means for detecting the rise of a signal from said signal forming means, which is caused according to the thickness of said specimen, to form a zero reference signal;
    means for detecting and holding a peak value of said signal from said signal forming means; and
    outputting means for subtracting an output of said zero setting means from an output of said peak holding means and outputting the result of subtraction.

10. A device as claimed in claim 9, in which said conveying means comprises:
    a first roller which is driven by a drive source, to convey said specimen; and
    a pressurizing roller for bringing said specimen into close contact with said first roller.

11. A device as claimed in claim 9, in which said signal forming means has an element for forming an analog electrical signal according to the action of said action providing means.

12. A device as claimed in claim 9, in which said signal forming means has an element for forming a digital signal according to the action of said action providing means.

13. A device as claimed in claim 9, which comprises means for detecting insertion of said specimen, an output of said insertion detecting means being utilized to end the holding operation of said peak holding means.

14. A device as claimed in claim 9, in which said outputting means is a display unit.

15. A device as claimed in claim 14, in which said outputting means is provided with a printer.

* * * * *